US011262316B2

(12) United States Patent
Shu et al.

(10) Patent No.: US 11,262,316 B2
(45) Date of Patent: Mar. 1, 2022

(54) METHOD OF SYNCHRONIZING A LINE SCAN CAMERA

(71) Applicant: TELEDYNE DIGITAL IMAGING, INC., Toronto (CA)

(72) Inventors: Felicia Yan Shu, Waterloo (CA); Matthias Sonder, Waterloo (CA); Dale Deering, Waterloo (CA)

(73) Assignee: Teledyne Digital Imaging, Inc., Toronto (CA)

( * ) Notice: Subject to any disclaimer, the term of this patent is extended or adjusted under 35 U.S.C. 154(b) by 357 days.

(21) Appl. No.: 16/320,880

(22) PCT Filed: Oct. 2, 2017

(86) PCT No.: PCT/CA2017/051168
§ 371 (c)(1),
(2) Date: Jan. 25, 2019

(87) PCT Pub. No.: WO2019/068162
PCT Pub. Date: Apr. 11, 2019

(65) Prior Publication Data
US 2021/0215619 A1 Jul. 15, 2021

(51) Int. Cl.
*G01N 21/89* (2006.01)
*G01N 21/898* (2006.01)
*G01N 21/84* (2006.01)

(52) U.S. Cl.
CPC ....... *G01N 21/8901* (2013.01); *G01N 21/898* (2013.01); *G01N 2021/8455* (2013.01); *G01N 2021/8909* (2013.01)

(58) Field of Classification Search
CPC .......................... G02B 27/48; G02B 19/0014; G02B 19/0052; G02B 19/0085; G02B 19/009;
(Continued)

(56) References Cited

U.S. PATENT DOCUMENTS

| 4,203,155 A | * | 5/1980 | Garst | ....................... D04H 1/00 700/122 |
| 4,641,942 A | | 2/1987 | Sakai | |

(Continued)

FOREIGN PATENT DOCUMENTS

| CN | 101482518 A | 7/2009 |
| CN | 104322046 A | 1/2015 |

(Continued)

OTHER PUBLICATIONS

Extended European Search Report; EP 17908770.5 Feb. 12, 2020.
(Continued)

*Primary Examiner* — Michael P Stafira
(74) *Attorney, Agent, or Firm* — Ridout and Maybee LLP

(57) ABSTRACT

A method of synchronizing a line scan camera. The method comprises: obtaining line scan data of a region of interest (ROI) of a travelling surface from the line scan camera, the line scan camera being oriented perpendicular to a direction of travel of the travelling surface, the line scan data comprising a plurality of lines; identifying occurrences of a major frequency of a repeated texture on the travelling surface using characterized line scan data for each line in the plurality of lines of the line scan data; determining a period of the major frequency; and changing a line rate of the line scan camera when the determined period is different than a reference period.

20 Claims, 11 Drawing Sheets

(58) Field of Classification Search
CPC .. G02B 19/0095; G02B 26/10; G02B 27/095;
G02B 21/00; G02B 21/002; G02B
21/0076; G02B 21/0084; G02B 21/16;
G02B 21/367; G02B 21/241; G02B
21/34; G02B 27/40; G01N 23/225; G01N
23/2251; G01N 2021/6471; G01N 21/64;
G01N 21/6458; G01N 2021/6482; G01N
21/6452; G01N 33/1826; G01N 33/1866;
G01N 2021/845; G01N 21/8901; G01N
21/8851; G01N 2021/8455; G01N
2021/8909; G01N 21/8806; G01N
21/898; G01N 21/8983; G01N
2021/1782; G01N 2021/1787; G01N
2021/3595; G01N 21/359; G01N
21/4795; G01N 21/89; G01N 2021/8908;
G01N 21/909; G01N 2021/8887; G01N
21/01; G01N 21/88; G01N 21/95607;
G01N 2021/8829; G01N 2021/95661;
G01N 21/274; G01N 21/8903; G01N
21/93; G01N 21/956; G01N 21/958;
G01N 2021/95615; G01N 2021/95638;
G01N 21/31; G01N 21/892; G01N 21/95;
G01N 21/9505; G01N 21/95684; G01N
2021/0112; G01N 2021/8812; G01N
2021/8848; G01N 2021/8867; G01N
2035/0439; G01N 2035/046; G01N
21/4738; G01N 21/55; G01N 21/718;
G01N 21/896; G01N 23/04; G01N
33/6845; G01N 35/04
See application file for complete search history.

(56) References Cited

U.S. PATENT DOCUMENTS

| | | | |
|---|---|---|---|
| 5,917,602 A | 6/1999 | Bonewitz et al. | |
| 6,683,293 B1 | 1/2004 | Wen | |
| 6,850,636 B1 * | 2/2005 | Yabe | G01N 21/8901 |
| | | | 382/108 |
| 6,933,975 B2 | 8/2005 | Wen | |
| 2003/0019931 A1 * | 1/2003 | Tsikos | G06K 9/325 |
| | | | 235/454 |
| 2003/0142289 A1 | 7/2003 | Ortyn | |
| 2004/0135914 A1 | 7/2004 | Wen | |
| 2005/0237403 A1 | 10/2005 | Baykal | |
| 2008/0013069 A1 | 1/2008 | Goodwin et al. | |
| 2010/0260378 A1 | 10/2010 | Noy et al. | |
| 2011/0115897 A1 * | 5/2011 | Najmabadi | G01N 21/64 |
| | | | 348/79 |
| 2011/0115903 A1 * | 5/2011 | Shalem | G01N 21/8851 |
| | | | 348/135 |

FOREIGN PATENT DOCUMENTS

| | | | | |
|---|---|---|---|---|
| CN | 104767901 A | | 7/2015 | |
| CN | 107037050 A | | 8/2017 | |
| DE | 102014115650 A1 * | | 4/2016 | G01B 11/04 |
| JP | 3600230 B2 | | 12/2004 | |
| WO | 9904550 | | 1/1999 | |
| WO | 2008107892 A1 | | 9/2008 | |
| WO | 201009445 | | 8/2010 | |
| WO | 2011075339 | | 6/2011 | |
| WO | WO-2019068162 A1 * | | 4/2019 | G01N 21/8983 |

OTHER PUBLICATIONS

Notification of Transmittal of the International Search Report and Written Opinion; PCT/CA2017/051168 dated May 17, 2018.

Office Action and English Translation; CN Application No. 201780046561.7 Jun. 2, 2021.

Jing Jin; Ultra-high speed scanning imaging technique research based on CCD 2015.

* cited by examiner

METHOD OF SYNCHRONIZING A LINE SCAN CAMERA

TECHNICAL FIELD

The present disclosure relates to a synchronizing line scan camera, and in particular, to a method of synchronizing a line scan camera.

BACKGROUND

A line scan camera has one or more lines of pixels that image across an object. A line scan camera may be used to create a two-dimensional image of the object by either moving the camera or the object perpendicular to the line of pixels, capturing lines at each position, and combining the lines. When the object is large, continuously moving and a high degree of reliability or high resolution imaging is required, a line scan camera may be preferable to a frame camera that captures two-dimensional images (a "frame").

Applications for line scan cameras, such as machine vision applications, may require that the line rate of a camera be synchronized with the speed of a moving object, such as a conveyor. Conventionally, hardware such as a shaft encoder is used to adjust the line rate of the line scan camera to match the speed of the moving object. However, encoder outputs often need some signal processing to be useful, for example, scaling the output to the web speed or jitter reduction to prevent a momentary overspeed condition. In addition, conventional solutions are difficult to install and configure and may be less reliable and slower than desired. Accordingly, there remains a need for improved methods of synchronizing a line scan camera.

SUMMARY

The present disclosure provides a method of synchronizing line scan camera speed (line rate) with the speed of a moving object. The method may be performed automatically by a camera control algorithm and may reliably auto-synchronize (self-synchronize) the line scan camera with the speed of the moving object. The method of the present disclosure eliminates the need for external electro-mechanical equipment such as a shaft encoder, thereby reducing the line scan system cost and installation complexity, and obviating problems associated with a lack of encoder precision (e.g., encoder jitter). The method has the potential to offer significant value advantage over competitive products for at least some applications.

In accordance with one aspect of the present disclosure, there is provided a method of synchronizing a line scan camera, comprising: obtaining line scan data of a region of interest (ROI) of a travelling surface from the line scan camera, the line scan camera being oriented perpendicular to a direction of travel of the travelling surface, the line scan data comprising a plurality of lines; identifying occurrences of a major frequency of a repeated texture on the travelling surface using characterized line scan data for each line in the plurality of lines of the line scan data; determining a period of the major frequency; and changing a line rate of the line scan camera when the determined period is different than a reference period.

In accordance with another aspect of the present disclosure, there is provided a line scan camera, comprising: an image sensor comprising one or more lines of pixels; a processor; a controller coupled to the line scan sensor and configured to cause the line scan camera to: obtain line scan data of a region of interest (ROI) of a travelling surface from the line scan camera, the line scan camera being oriented perpendicular to a direction of travel of the travelling surface, the line scan data comprising a plurality of lines; identify occurrences of a major frequency of a repeated texture on the travelling surface using characterized line scan data for each line in the plurality of lines of the line scan data; determine a period of the major frequency; and change a line rate of the line scan camera when the determined period is different than a reference period. The line scan camera may be a single line, line scan camera. The controller may be a field-programmable gate array. Alternatively, the controller may be a processor coupled to a memory, the memory storing executable instructions that, when executed by the processor and configure the operation of the line scan camera.

In accordance with a further aspect of the present disclosure, there is provided a line scan camera, comprising: an image sensor comprising one or more lines of pixels; a processor; a memory coupled to the processor and image sensor, the memory storing executable instructions that, when executed by the processor, cause the line scan camera to perform the methods described herein.

In accordance with yet a further aspect of the present disclosure, there is provided a non-transitory machine readable medium having tangibly stored thereon executable instructions for execution by a processor of a line scan camera, wherein the instructions, when executed by the processor, cause the line scan camera to perform the methods described herein.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

Figure 1:
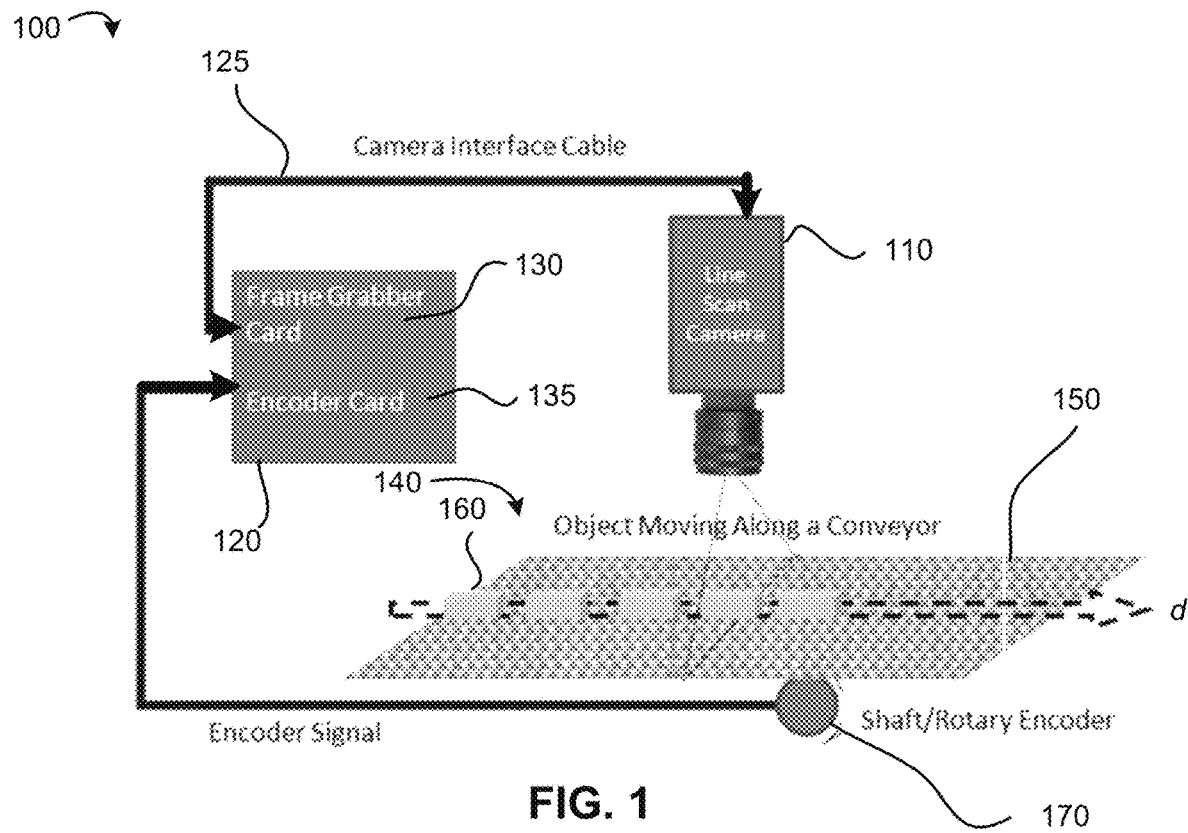
FIG. 1 is a schematic diagram of a line scan imaging system in accordance with the prior art.

Referring to FIG. 1, a schematic diagram of a line scan imaging system 100 in accordance with the prior art will be described. The system 100 includes a line scan camera 110. The line scan camera 110 scans a moving conveyor 140 in a direction perpendicular to the travel direction of the moving conveyor 140, and captures lines of image data, each line comprising a number of pixels. The skilled person would understand that line scan cameras 110 are more suitable than area scan cameras for such continuous processes such as a moving conveyor 140. In the shown example, a plurality of objects 160 (e.g., parts or products) are located on the moving conveyor 140 and move along with the conveyor 140. The travel direction of the conveyor 140 is shown in FIG. 1 by the arrow "d".

The line scan camera 110 is connected to a controller 120, such as a computer, via a camera interface cable 125. The controller 120 includes a frame grabber card 130 and an encoder card 135. The frame grabber card 130 obtains line scan data from the line scan camera 110 for subsequent use, for example in visual inspection of the parts or products 160 on the conveyor 140. The encoder card 135 is connected to a shaft (rotary) encoder 170 in contact with the conveyor 140. The encoder 170 may be in direct contact with a travel surface 150 of the conveyor 140. The travelling surface may be a belt, web, film or the like. The encoder 170 measures the speed of the conveyor 140 and the objects 160 thereon, and sends the measured speed to the controller 120. The controller 120 uses the measured speed of the conveyor 140 to adjust the line rate of the line scan camera 110 to synchronize the line rate with the measured speed.

Figure 2:
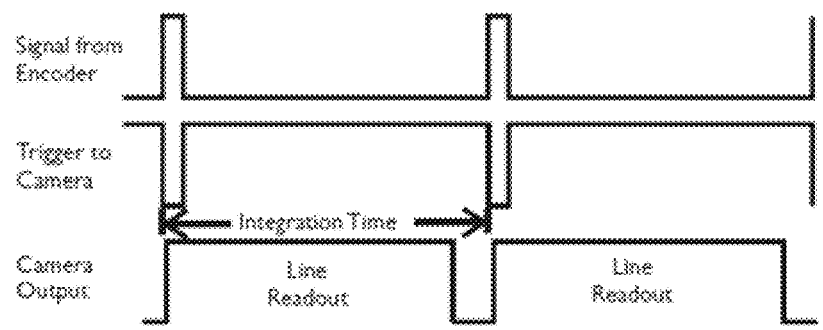
FIG. 2 is a timing diagram illustrating the relationship between the camera trigger, camera output and encoder signal in accordance with a line scan imaging system of the prior art.
Figure 3:
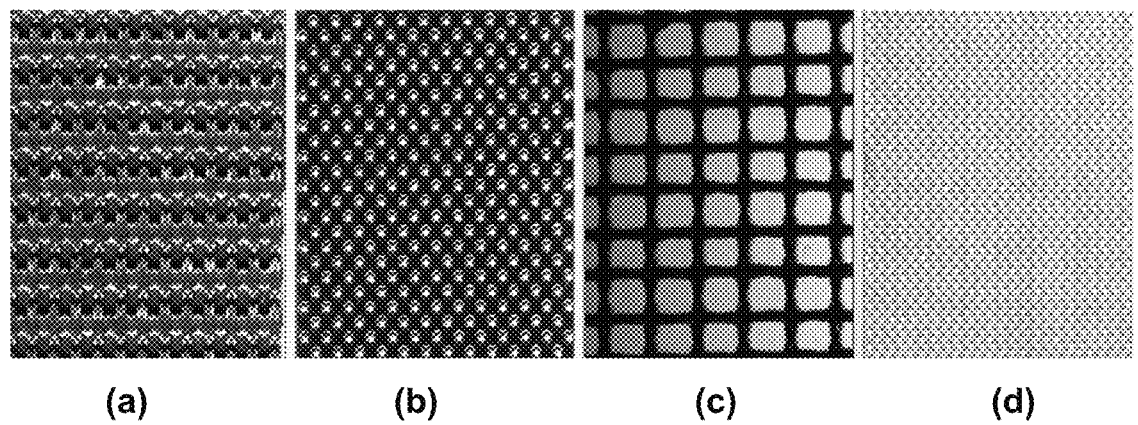
FIGS. 3(a) to 3(d) are images illustrating the surface of four types of typical conveyor belts.

FIG. 2 is a timing diagram illustrating the relationship between the encoder signal, camera trigger and camera output in accordance with a line scan imaging system of the prior art such as that shown in FIG. 1. As shown in FIG. 2, the controller 120 of the system 100 uses a signal generated by and received from the encoder 170 to determine whether the line rate needs to be changed and the amount of that change (if any), and then controls the line scan camera 110 to change the line rate of the line scan camera 110.

Figure 4:
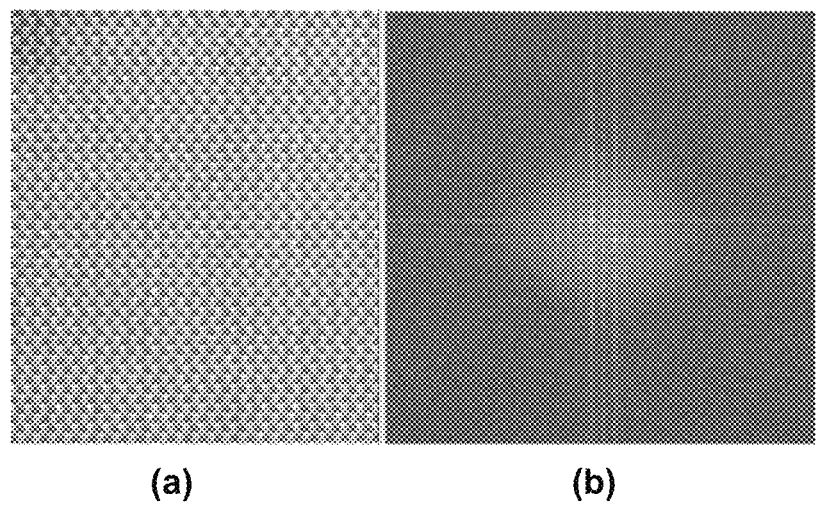
FIG. 4(a) is an image of the surface of a sample conveyor belt and FIG. 4(b) is a magnitude spectrum of a fast Fourier transform of that image.

FIGS. 3(a) to 3(d) illustrate the surface of four types of typical conveyor belts. While the surface of the conveyor belts differs, it may be seen from FIGS. 3(a) to 3(d) that the conveyor belts typically have a repeated texture. The inventors have discovered that repeated textures have a distinct spatial frequency spectrum: one major frequency and some harmonics. FIG. 4(a) is an image illustrating the surface of an example conveyor belt and FIG. 4(b) is a magnitude spectrum of a fast Fourier transform (FFT) of that image. The major frequencies of the repeated texture of the conveyor belt in FIG. 4(a) are shown as peaks in spectrum in the FFT of FIG. 4(b).

Figure 5:
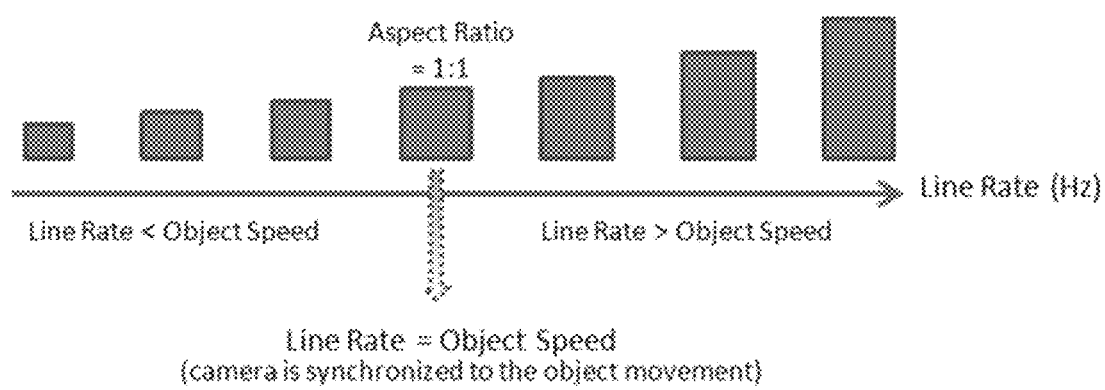
FIG. 5 is a schematic diagram illustrating changes in the pixel aspect ratio of an image generated from a line scan camera having square pixels as the camera line rate and object speed change.

The inventors have discovered that with a change of line rate and/or object speed, the period of the repeated texture (e.g., conveyor belt) in the vertical direction also changes, as shown in FIG. 5 but that the period of the repeated texture in the horizontal direction does not change. The travel direction of the moving conveyor 140 is referred to as the vertical direction whereas the direction of perpendicular to the travel direction of the moving conveyor 140 that is scanned by the line scan camera 110 is referred to as the horizontal direction. FIG. 5 is a schematic diagram illustrating changes in the pixel aspect ratio of an image generated from a line scan camera having square pixels when the camera line rate is less than the object speed, equal to the object speed, and greater than the object speed. As may be seen in FIG. 5, when the line rate and object speed are synchronized (i.e., the same), the image has a 1:1: pixel aspect ratio. However, the image is compressed when the line rate is less than the object speed, and stretched when the line rate is greater than the object speed.

The inventors have developed a method of determining a major frequency of the repeated texture of a moving conveyor belt using autocorrelation, determining a period at which the major frequency occurs, and determining a new line rate for the line scan camera to synchronize the speed of camera with the moving object (e.g., conveyor) by comparing to the calculated period with a reference period. The reference period is the period of the major frequency in horizontal direction if the textures are equal in horizontal and vertical directions. Otherwise, it is the period of the major frequency in vertical direction. The reference period is determined either in real-time or in training prior to real-time operations. The method may be implemented by a line scan camera allowing it to auto-synchronize (self-synchronize) contrary to the widely held belief that it was not possible for line scan cameras to auto-synchronize (self-synchronize).

While described in the content of an image having a 1:1: pixel aspect ratio, the same approach may be used line scan cameras having a pixel aspect ratio that is not 1:1. In such cases when the sensor pixels are not square, the reference period is calculated in training as described herein whether or not the repeated texture has the same period in the horizontal and vertical directions.

Figure 6:
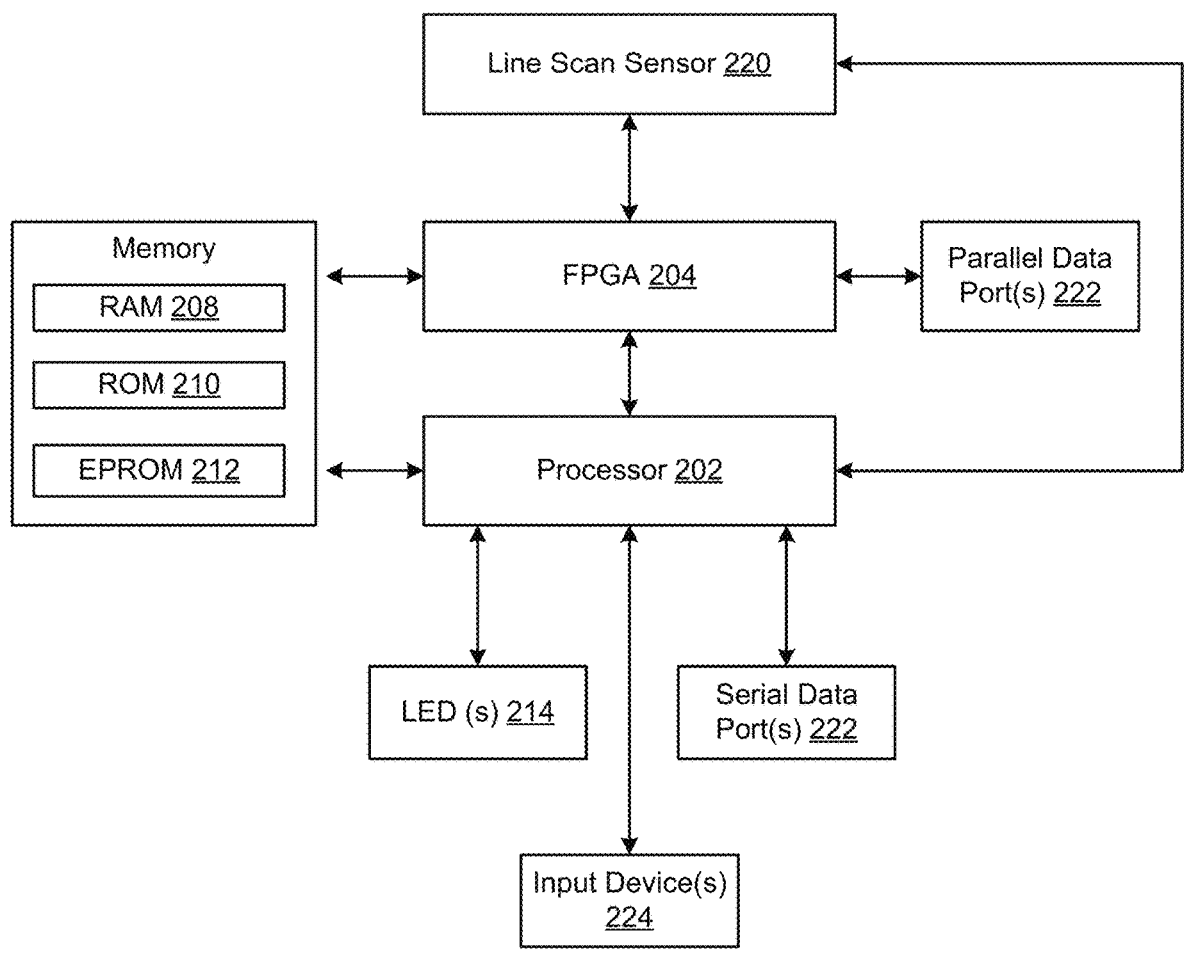
FIG. 6 is a block diagram illustrating select components of a line scan camera in accordance with an example embodiment of the present disclosure.

FIG. 6 is a block diagram illustrating select components of a line scan camera 200 in accordance with an example embodiment of the present disclosure. The line scan camera 200 includes a processor 202 (e.g., microprocessor or microcontroller) coupled to a plurality of components via a communication bus (not shown) which provides a communication path between the various components and the processor 202. The line scan camera 200 also comprises memory such as Random Access Memory (RAM) 208, Read Only Memory (ROM) 210, a persistent (non-volatile) memory 212 which may be flash erasable programmable read only memory (EPROM) ("flash memory") or other suitable form of memory.

The processor 202 performs various image processing functions. The processor 202 is typically a programmable processor but may be, for example, a hard-wired custom integrated circuit (IC) processor, or a combination thereof. In other embodiments, a dedicated image processor may be provided rather than having the processor 202 perform image processing functions.

The line scan camera 200 also comprises a line scan sensor 220 which receives light from the area being imaged. Image data captured by the line scan sensor 220 is transferred to a readout register (also known as a line buffer). In the shown embodiment, the readout register is a field-programmable gate array (FPGA) 204. The line scan camera 200 also comprises one or more parallel data ports 212 for exchanging data with external systems, connected to the FPGA 204 in the shown embodiment, and one or more serial data ports 222 for exchanging data with external systems, connected to the processor 202 in the shown embodiment. The readout register outputs data to a buffer memory (not shown), such as another FPGA. The line data stored in the FPGA buffer memory may then undergo further processing and/or transfer to a host system via a serial data port 222, parallel data port 212, or both. The line scan camera 200 typically also includes one or more light emitting diodes (LEDs) 214 which are turned on or flashed to provided various notifications and optionally one or more user input devices 224 (e.g., buttons).

The line scan sensor 220 may be a charge-coupled device (CCD), complementary metal-oxide semiconductor (CMOS) sensor or other suitable sensor. The line scan sensor 220 may be monochrome, multicolor (e.g., RGB color) or multispectral. The line scan sensor 220 has one or more lines of pixel sensors: the line scan sensor 220 may be a single line or multiline sensor. The line scan sensor 220 may alternatively be a time delay and integration (TDI) sensor. Suitable line scan cameras are made by Teledyne DALSA Inc. (Waterloo, Ontario, Canada). Each line of the line scan sensor 220 has a number of pixel sensors (or pixels). The number of pixels in each line may be as much 2,048 to 16,384 or more. Each of the pixels has a pixel value in the form of a digital number (DN) which represents a response level of a light at certain wavelength.

The pixel value is a single number that represents the intensity (or brightness) of the pixel. The number of bits of the pixels and the color (or lack of color) captured by the line scan sensor 220 may vary between line sensors. For example, the pixels may be 8-bit grayscale, 8-bit color, 16-bit color, 24-bit color, 30-bit color, 36-bit color or 48-bit color. In some examples, 8-bit pixels are used with individual pixel values ranging from 0 to 255. For grayscale (monocolor) line scan cameras, typically a pixel value of 0 represents black, 255 represents white, and values in between 0 and 255 define different shades of gray. Color line scan cameras have rows of sensor pixels with different color filters or different color filters on pixels along the row, to detect light of different wavelengths. Typically, red, green, and blue (RGB) color filters are used but more and different filter types may be used for some applications. Each color filter is located on pixels to detect light of different wavelengths, typically red, green or blue, so that the pixel value of 0 represents no color (e.g., no red, no green, no blue) and 255 represents full color, and values in between 0 and 255 define different shades of a respective color. Color line scan cameras may sometimes be operated on monocolor or full color modes. To represent full color, separate red, green and blue components are specified for each pixel in an RGB colorspace, so the pixel value is actually a vector of three numbers that may be stored as different components as three separate color planes (one for each of red, green and blue), which are recombined when displaying or processing in full color.

During the camera's exposure time each pixel accumulates photoelectric charges proportional to the light from the object imaged onto that pixel. At the end of the exposure time the charges in an entire row of pixels are transferred into the readout register (e.g., FPGA 204). The readout register shifts out the pixel charges and they are amplified, corrected and digitized to produce the camera output. The readout register temporarily stores image data for one or more lines, typically 1 to 3 lines, before the line scan data is transferred to memory. The readout register shifting is done while the next row of pixels is being exposed. The rate at which exposure and readout occurs is called the "line rate" and is typically specified in hertz (Hz) or kilohertz (kHz). The line scan camera 200 may have a line rate of up to 200 kHz or more. An adjustable aperture and shutter assembly (not shown) is used to control the aperture size and the exposure time of the line scan sensor 220.

The processor 202 may control the image sensor 220 by supplying various control signals to the line scan sensor 220. The memory of the line scan camera 200, for example the EPROM 212, has stored thereon software that is executed by the processor 202 that controls the operation of the line scan camera 200. The line scan camera 200 may also or alternatively be controlled, at least in part, by the FPGA 204. Although a specific configuration of different types of memory is described, this is merely one example and a different configuration and assignment of functions to different types of memory may be used.

Although not shown in FIG. 6 or described above, it will be understood to the skilled person that lens, illumination, and focusing optics are used in combination with the line scan camera as part of a line scan imaging system. Typically, these components are not controlled by the line scan camera.

Figure 7:
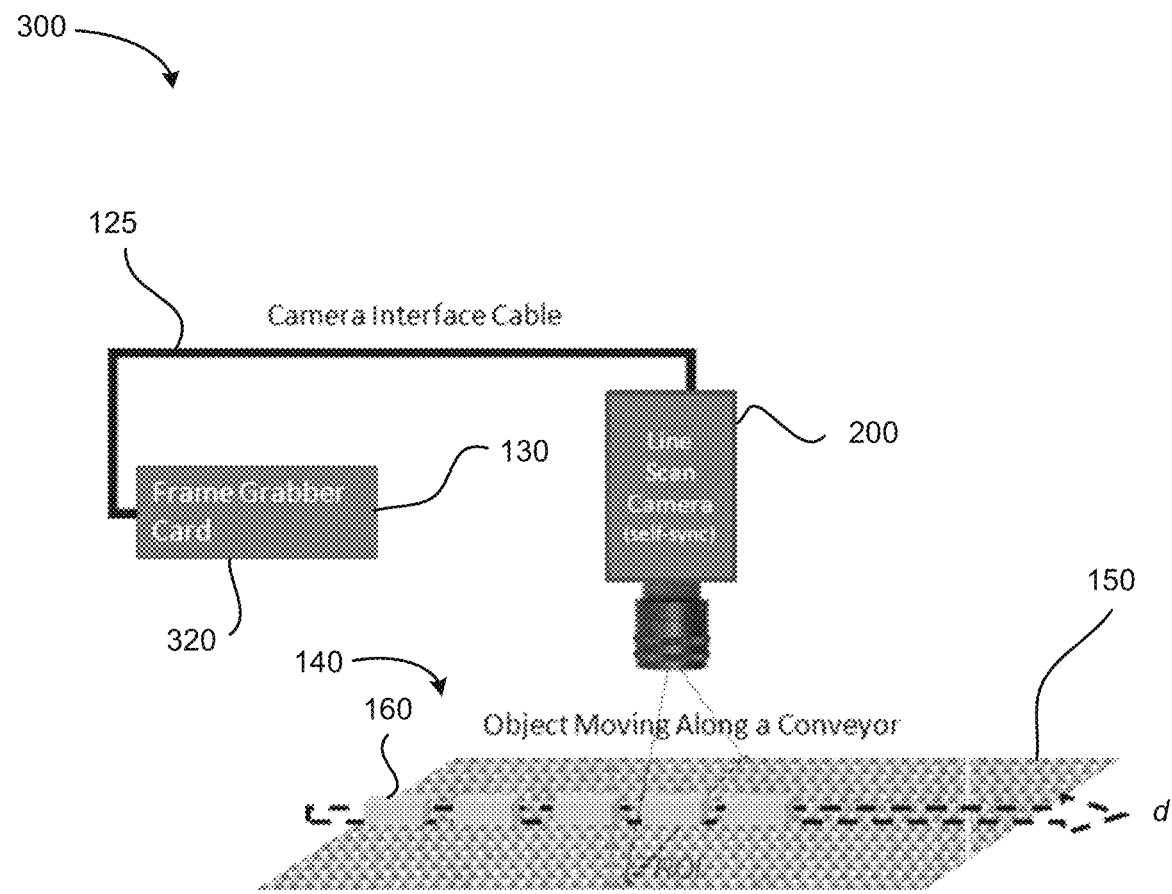
FIG. 7 is a schematic diagram of a line scan imaging system with an auto-synchronizing line scan camera in accordance with the present disclosure.

Referring to FIG. 7, a schematic diagram of a line scan imaging system 300 with an auto-synchronizing (self-synchronizing) line scan camera 200 in accordance with the present disclosure is shown. The system 300 comprises a line scan camera 200 that images a moving conveyor 140 having a plurality of objects 160 (e.g., parts or products) located thereon and moving along with the conveyor 140. The line scan camera 200 is connected to a controller 320, such as a computer, via a camera interface cable 125. The controller 320 includes a frame grabber (F/G) card 130 that obtains line scan data from the line scan camera 200 for subsequent use, for example in visual inspection of the parts or products on the conveyor 140. Alternatively, the line scan camera 200 may comprise a direct connect interface such as Gig™ or USB™ instead of using a F/G card 130 allowing the encoder signal to be fed directly into the line scan camera 200.

The conveyor 140 includes a travelling surface 150 (e.g., belt) having a repeated texture. The line scan camera 200 is oriented such that the one or more sensor lines of the line scan camera 200 (i.e., the camera scanning direction) are oriented perpendicular to the direction of travel of the conveyor belt (object), shown in FIG. 7 by the arrow "d". The line scan camera 200 is configured to such that the FOV of the line scan camera 200 images at least a substantial portion of the width (transverse portion) of the traveling surface 150. In one example, the line scan camera 200 has one or more lines of pixels (e.g., 1 or 2 lines) that capture most or all of the traveling surface 150 across its width. A portion of the FOV of the line scan camera 200 is used for synchronizing operations, described herein. This portion of the FOV is referred to as a region of interest (ROI). The ROI is located at a portion of the travelling surface 150 where objects 160 are less likely to travel, typically at or towards an edge of the travelling surface 150 as shown in FIG. 7. Typically, the ROI is at least 100 pixels, typically 128 to 256 pixels wide. In some examples, the line scan camera has a line scan sensor of between 1K and 16K pixels wide and the ROI is 128 pixels (horizontal).

Figure 8A:
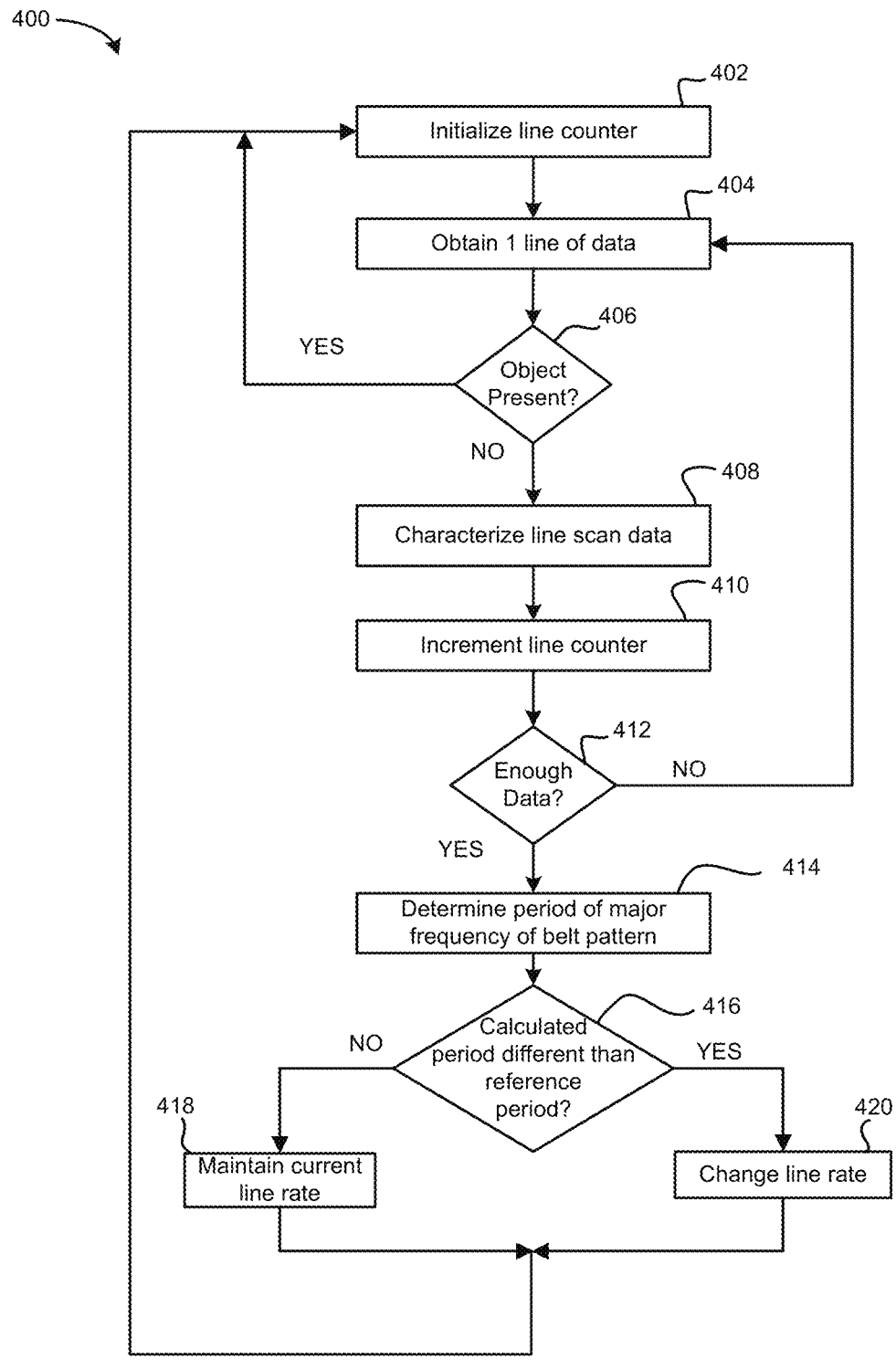
FIGS. 8A and 8B are flowcharts illustrating example methods of synchronizing a line scan camera in accordance with one example embodiment of the present disclosure.

Reference is now made to FIG. 8A which illustrates a flowchart of a method 400 of synchronizing a line scan camera 200 in accordance with one example embodiment of the present disclosure. The method 400 may be carried out by software executed, for example, by the processor 202 of a line scan camera 200. Alternatively, the method 400 may be implemented by the FPGA 204.

At operation 402, the processor 202 of the line scan camera 200 initializes a line counter at zero.

At operation 404, one line of line scan data is captured by the line scan sensor 220 of the line scan camera 200 at an initial line rate and output to the processor 202. The initial line rate may vary. In some examples, the initial line rate may be between 2 kHz and 20 kHz.

At operation 406, the processor 202 optionally determines whether an object is present in the ROI of the line scan camera 200. In some examples, contrast changes in the line data are monitored by the processor 202 and used to determine whether an object is present. The processor 202 determines a contrast value of the line scan data and determines whether the contrast of the image has changed from a reference by more than a threshold amount. One way to calculate contrast is (max-min)/mean. The contrast of each line data within the ROI is calculated and compared to the reference. The reference may be a contrast value calculated at the first few seconds of power up. When the contrast of the line scan data has changed by more than the threshold amount, the processor 202 determines that an object is present. When the contrast of the line scan data has not changed by more than the threshold amount, the processor 202 determines that an object is not present. Different methods of determining whether an object is present in the ROI may be used in other embodiments. The alternative methods may use line scan data or possibly other types of sensor data. For an example, other image-based criteria for the presence of an object may be used in other embodiments. For another example, a proximity sensor, which may be part of the line scan camera 200 or external to it and connected to the line scan camera 200 via a data port 222, may be used to detect the presence of an object in the ROI.

Alternatively, to determine whether an object is present in the ROI of the line scan camera 200 processor 202 optionally determines whether an object is present in the ROI of the line scan camera 200, line data within the ROI may be obtained, a FFT may be applied to obtain an FFT spectrum. If there are objects within the ROI, the FFT spectrum will not be periodic and a period cannot be obtained. However, when the textured surface has scratches or the like, or small fibers and/or hairs are on the conveyor belt, the algorithm is robust and a period may still be obtained When an object is present in the ROI, the method 400 cannot be completed and the processor 202 resets the line counter to zero. The line scan camera 200 then continues to obtain line scan data from the line scan camera 200 (operation 404). The line rate of the line scan camera 200 remains unchanged.

When an object is not present in the ROI, operations continue to 408 at which the processor 202 performs image characterization on the line scan data, and the result is saved in the buffer memory. The image characterization represents a statistics measure of the digital numbers (DNs) of the line scan data. The image characterization performed by the processor 202 may vary between embodiments. In some examples, the image characterization is a low pass filter applied to the line scan data. The low pass filter may apply equal weightings to return an equivalent of a mean value of the DN values of the line scan data. Alternatively, unequal weightings may be applied by the low pass filter. The weightings applied by the low pass filter may be used, for example, to reduce noise in the line scan sensor 220. The value of the weightings depends on the noise level of the particular sensor 220 used. Alternatively, a simple mean value of the DN values or other statistical measure of the line may be used.

At operation 410, the processor 202 increments the line counter.

At operation 412, the processor 202 determines whether enough line data has been obtained. A minimum number of lines for the subsequent image analysis is set to ensure reliability. The processor 202 determines whether the minimum number of lines has been obtained using the value of the line counter. When the minimum number of lines has not been obtained, the operations return to proceed to 404 at which more line data is acquired. When the minimum number of lines has been obtained, the operations proceed to 414. The minimum number of lines may vary. In some examples, the number of lines is 2,048.

At 414, the processor 202 determines (i.e., calculates) a period of a major frequency of the repeated pattern of the travelling surface 150 in the vertical direction from the characterized line scan data. At operation 416, the processor 202 determines whether the calculated period of the major frequency is different than a reference period of the major frequency.

When the calculated period of the frequency is the same as the reference frequency, the line rate is synchronized with the travelling surface (objects) and no change to the line rate of the line scan camera 200 is needed. At operation 418, the line rate is maintained.

When the calculated frequency is different than the reference frequency, the line rate is not synchronized with the travelling surface (objects). When the line rate is lower than the travelling surface, the line rate is increased. When the line rate is higher than the travelling surface 150, the line rate is decreased. At operation 420, the line rate is changed. The new line rate is calculated according to the following equation:

$$\text{new line rate} = \text{current line rate} * \left[\frac{\text{reference period}}{\text{calculated period}}\right]$$

The calculated new line rate is then set as the current line rate for the line scan camera 200.

In some embodiments, a minimum and/or maximum line rate may be set for the line scan camera 200. In such embodiments, the line rate for the line scan camera 200 may only be increased up to the maximum line rate or decreased down to the minimum line rate. In other words, when the calculated new line rate is above the maximum line rate, the new line rate is set to the maximum line rate and when the calculated new line rate is below the minimum line rate, the new line rate is set to the minimum line rate.

Although not shown, it will be understood that the method 400 is a continuous process and that a command or interrupt to discontinue the method 400 may be received from the controller 320 at any time during the performance of the method 400. In the absence of such a command or interrupt from the controller 320, the processor 202 repeatedly performs the method 400.

It will be appreciated that determining whether an object is present in the ROI of the line scan camera 200 is optional. In some applications, the processor 202 does not determine whether an object is present in the ROI of the line scan camera 200, for example, because the operator leaves the edge of one side of the conveyor belt empty for running the auto-sync or may adhere textured material on one side-edge of the belt if the belt material is flat without texture, and leave that part empty.

Figure 8B:
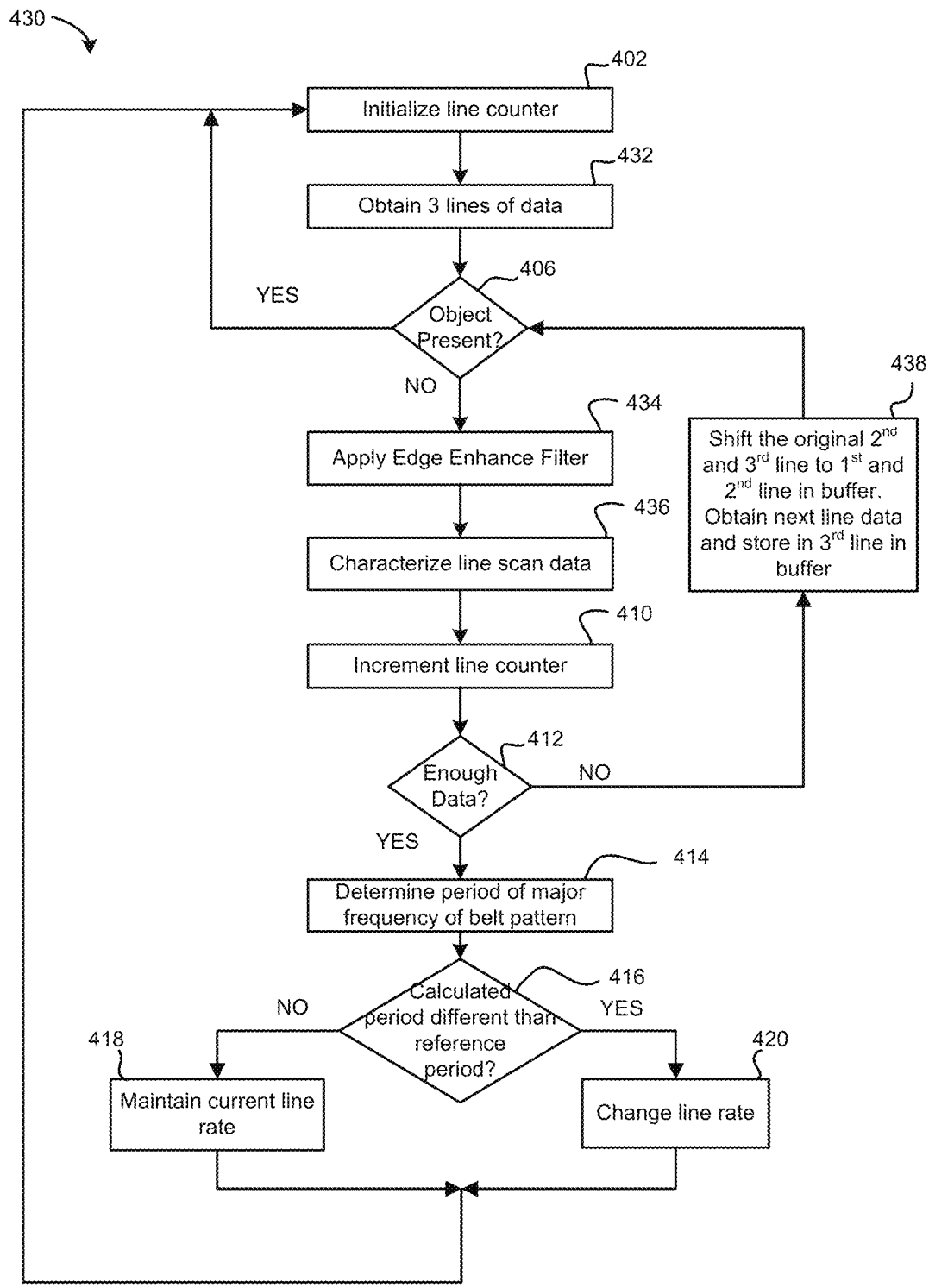

Reference is now made to FIG. 8B which illustrates a flowchart of a method 430 of synchronizing a line scan camera 200 in accordance with one example embodiment of the present disclosure. In the described embodiment, the line scan camera 200 has a three line buffer. The method 430 is similar to the method but differs in that an edge enhancement filter is applied. The edge enhancement filter may be applied when the repeated pattern creates too much blur. The edge enhancement filter reduces or removes blur and facilitates subsequent image analysis.

At operation 402, the processor 202 of the line scan camera 200 initializes a line counter at zero.

At operation 432, three lines of line scan data is captured by the line scan sensor 220 of the line scan camera 200 at an initial line rate and output to the processor 202.

At operation 406, the processor 202 determines whether an object is present in the ROI of the line scan camera 200. When an object is not present in the ROI, operations continue to 434 at which the processor 202 applies an edge enhancement filter on the data in ROI. The decision whether an edge enhancement is needed is made during training prior to real-time operations. In some examples, a Prewitt kernel is applied. In other examples, a Sobel kernel or a Roberts kernel may be applied.

At operation 436, the processor 202 performs image characterization on the ROI of the second line of the edge enhanced data output from the function enhanceEdges( ), and the result is saved in the buffer memory.

At operation 410, the processor 202 increments the line counter.

At operation 412, the processor 202 determines whether enough line data has been obtained. When the minimum number of lines has not been obtained, the operations return to proceed to 438 at which the content of the second and third line are shifted to the first and second line in the buffer, and the next line is obtained and stored in the buffer memory as the third line. When the minimum number of lines has been obtained, the operations proceed to 414 and the operations 430 continue in the same manner as the method 400.

Figure 9:
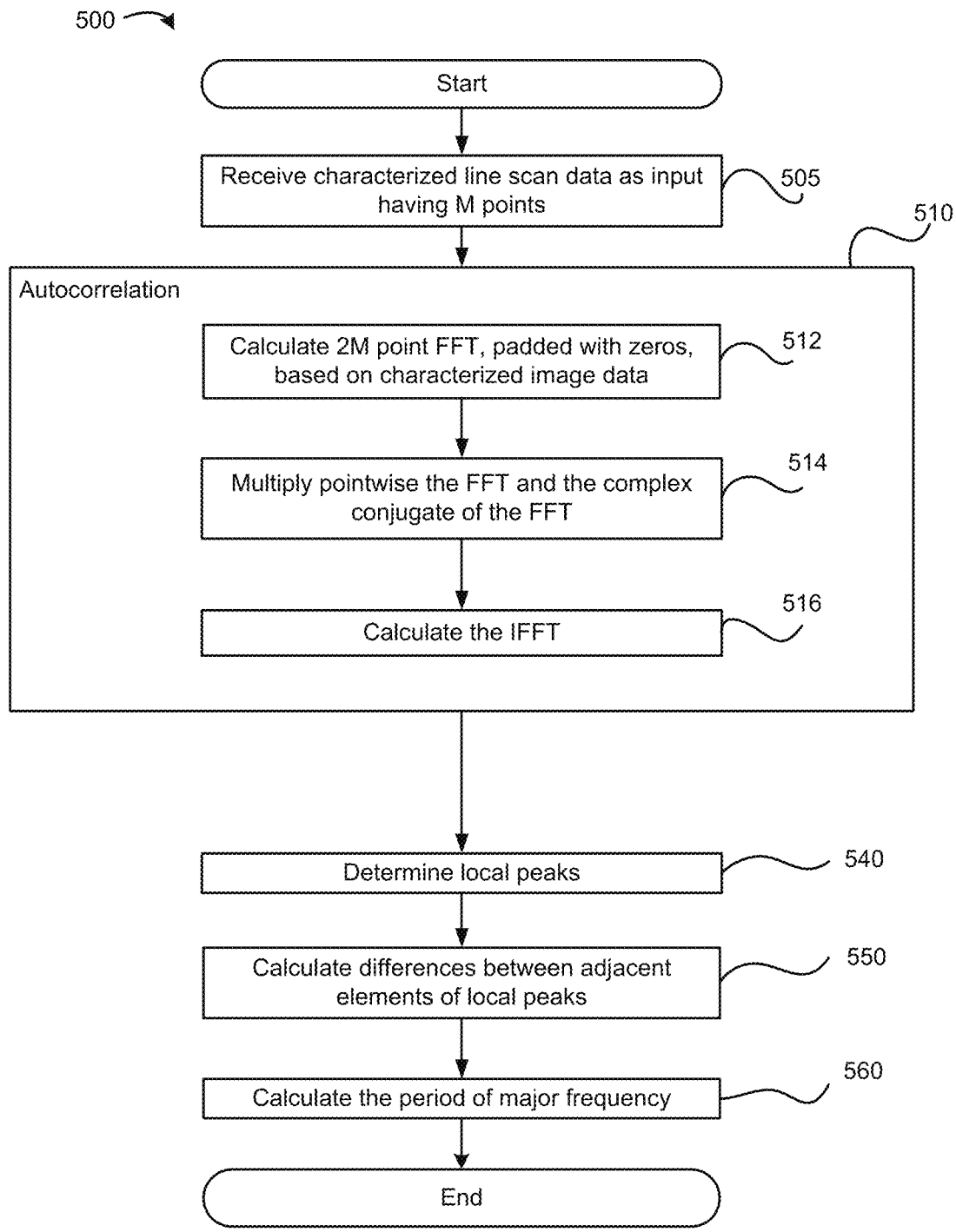
FIG. 9 is a flowchart illustrating an example method of determining a period of a major frequency of a repeated texture in accordance with one example embodiment of the present disclosure.

Reference is now made to FIG. 9 which illustrates a flowchart of an example method 500 of determining a period of a major frequency of a repeated texture in accordance with one example embodiment of the present disclosure. The method 500 may be carried out by software executed, for example, by the processor 202 of a line scan camera 200. Alternatively, the method 400 may be implemented by the FPGA 204.

At operation 505, characterized line scan data having M data points are received as input in the processor 202 from the buffer memory. In other words, characterized line scan data corresponding to M lines of line scan data are received. In some examples, M is equal to 2,048 (i.e., 2,048 lines of characterized line scan) are input.

At operation 510, the processor 202 performs autocorrelation on the characterized line scan data. Autocorrelation is used to determine the major frequency of the travelling surface 150 from the line scan data. In this way, the period of the repeated texture in the vertical direction at certain line rate may be calculated. The autocorrelation operation 510 will now be described in more detail. Autocorrelation may be more efficiently calculated using FFT. The autocorrelation is done by multiplying an FFT by the complex conjugate of the FFT and then applying the inverse FFT. This is very convenient for hardware implementation because most FPGAs, such as Xilinx™, have an IP core for 1D/2D FFT/IFFT.

It will be appreciated that autocorrelation is not normally used for 2D image processing. Autocorrelation is typically used for 1D signals like radio. However, the inventors have discovered that autocorrelation techniques may be adapted to 2D image processing. In particular, autocorrelation may be used to identify if data is random and if a time series model exists in the data. Autocorrelation refers to the correlation of a signal with a delayed copy of itself. Instead of correlation between two different variables, the correlation is between two values of the same variable at times $x_i$ and $x_{i+k}$, and it is the similarity between observations as a function of the time lag between them. The equation to give the correlation between observations separated by k time steps:

$$r_k = \frac{\sum_{i=1}^{N-k}(x_i - \bar{x})(x_{i+k} - \bar{x})}{\sum_{i=1}^{N}(x_i - \bar{x})^2}$$

wherein $$\bar{x} = \sum_{i=1}^{N} x_i$$

is the overall mean, $r_k$ is the autocorrelation coefficient between N pairs of successive observations on the same variable at times $x_i$ and $x_{i+k}$ at lag k.

For a periodic signal, i.e. the repeated texture of a conveyor belt, there is a lag k at which the largest coefficient $r_k$ occurs.

At operation 512, the processor 202 calculates the FFT based on the M points (e.g., 2,048 points) of the characterized line scan data received as input, padded with zeros to 2M points (e.g., 4,096 points), to obtain a frequency domain representation (FFT spectrum) of the characterized line scan data (e.g., fft_data=FFT (data, 2M)). At operation 514, the processor 202 multiples the FFT pointwise with the complex conjugate of the FFT (e.g., rm=fft_data×conj(fft_data)). At operation 516, the processor 202 calculates the IFFT (e.g., ac=IFFT (rm)).

Figure 10:
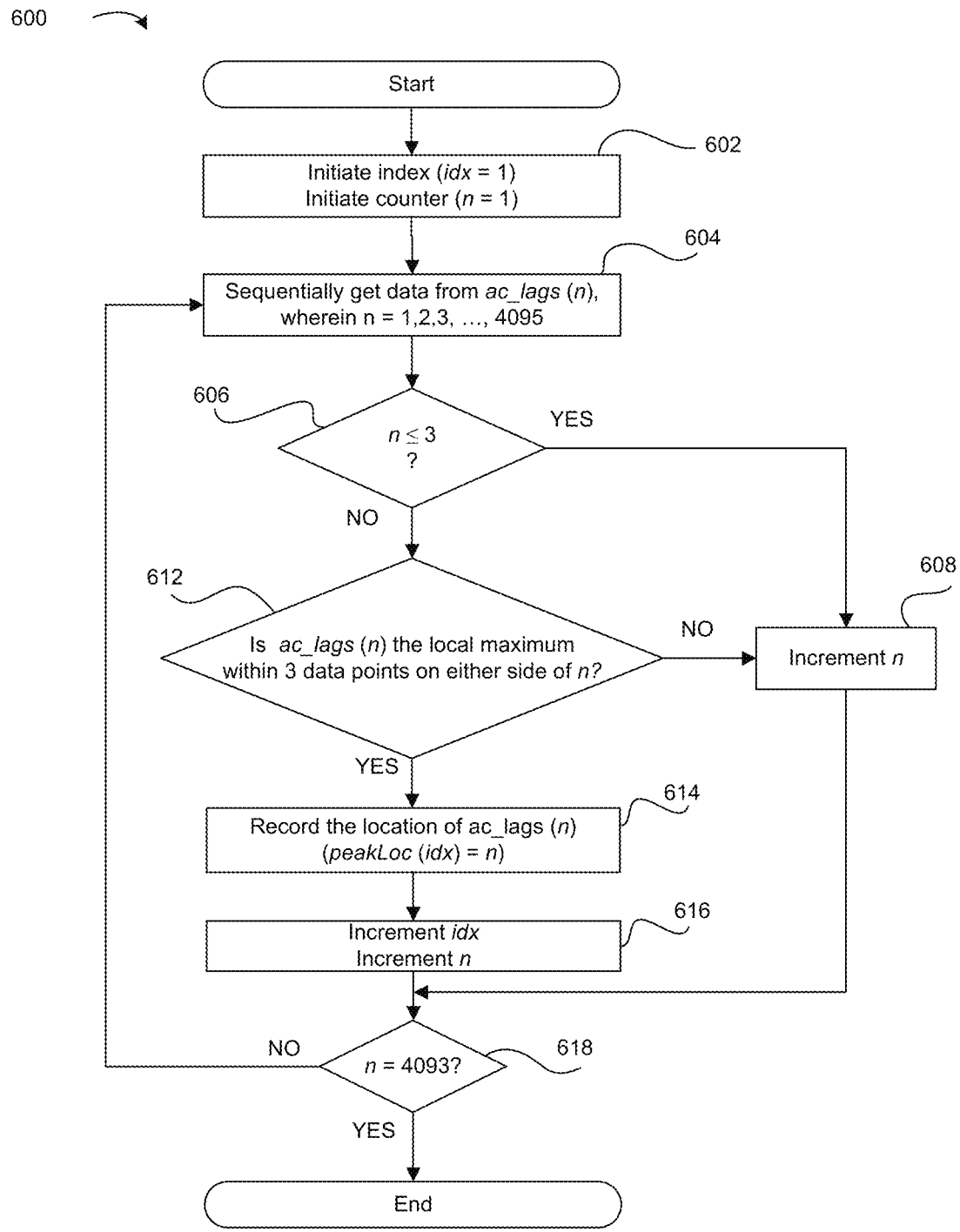
FIG. 10 is a flowchart of a method of determining local peaks within 3 data points in accordance with one example embodiment of the present disclosure.

At operation 540, the processor 202 determines the local peaks of the signal by identifying local maximum values (e.g., peakLoc=findLocalMaxima (ac_lags, 3). Referring now to FIG. 10, a method 600 of determining local peaks maximum within 3 data points in accordance with one example embodiment of the present disclosure will now be described. At 602, the processor 202 initializes an index ("idx") and a counter ("n") at 1. At 604, the processor 202 sequentially gets data from ac_lags (n), wherein ac_lags (n) is an array of signed floating point numbers and n=1, 2, 3, . . . , 4095.

At 606, the processor 202 determines whether n is less than or equal to 3. When n is less than or equal to 3, the processor 202 increments the counter by 1 at operation 608. When n is greater than 3 and not greater than 4092, the processor 202 determines whether the value of ac_lags (n) is the local maximum within 3 data points on either side of n.

When the value of ac_lags (n) is not the local maximum, the processor 202 increments the counter by 1 at operation 608. When the value of ac_lags (n) is the local maximum, the location of the ac_lags (n) is stored in an array (e.g., peakLoc (idx)=n)) at operation 614. At operation 616, the processor 202 increments the index idx and the counter n.

At 618, the processor 202 determines whether n is equal to 4,093. When n is not equal to 4,093, the operations return to operation 604 at which the processor 202 sequentially gets data from ac_lags (n). When n is equal to 4,093, the operations 600 end.

Referring again to FIG. 9 and the method 500, at operation 550, the differences between adjacent local peaks is determined (e.g., diff_peakLoc=[peakLoc(2)−peakLoc(1), peakLoc(3)−peakLoc(2), . . . peakLoc(n)−peakLoc(n−1)] for n peaks).

At operation 560, a period of major frequency in the vertical direction is calculated as the mean (average) of the differences between adjacent local peaks (e.g., period=mean (diff_peakLoc)).

Depending on the types of the texture, the reference period may be determined either in real-time or during training prior to real-time operations. If the repeated texture is equal in both the horizontal direction and vertical direction, for example, FIGS. 3(b) and 3(d), the reference period may be determined in real-time. In this case, the period of the repeated texture in the horizontal direction is calculated in the first few seconds of camera power on and only needs to be calculated once because the period of texture in horizontal direction does not change with the change of line rate or object speed. The period of horizontal texture is saved as the reference period. Even more, if the texture is not blurred much with the system settings and/or FOV, edge enhancement is not necessary and the whole training process may be eliminated.

If the repeated texture is not equal in both horizontal and vertical directions, such as FIGS. 3(a) and 3(c), the reference period is determined during training prior to real-time operations. In this case, objects with known aspect ratio are put on conveyor belt. The conveyor is initialized with a speed and the camera line rate is adjusted until the aspect ratio of the objects appears in the proper aspect ratio. The period of the repeated texture is then in the vertical direction and saved as the reference period.

The new line rate to synchronize the speed of camera and conveyor may then be determined by making period of the repeated texture in the vertical direction equal to the reference period.

The algorithm of calculating period in the horizontal direction is the same as that in vertical direction with a flipped ROI. Given the fact that a conveyor is usually empty in the first few minutes of camera power on, the period of the texture in horizontal direction may be calculated very quickly, typically just a few seconds.

Figure 11:
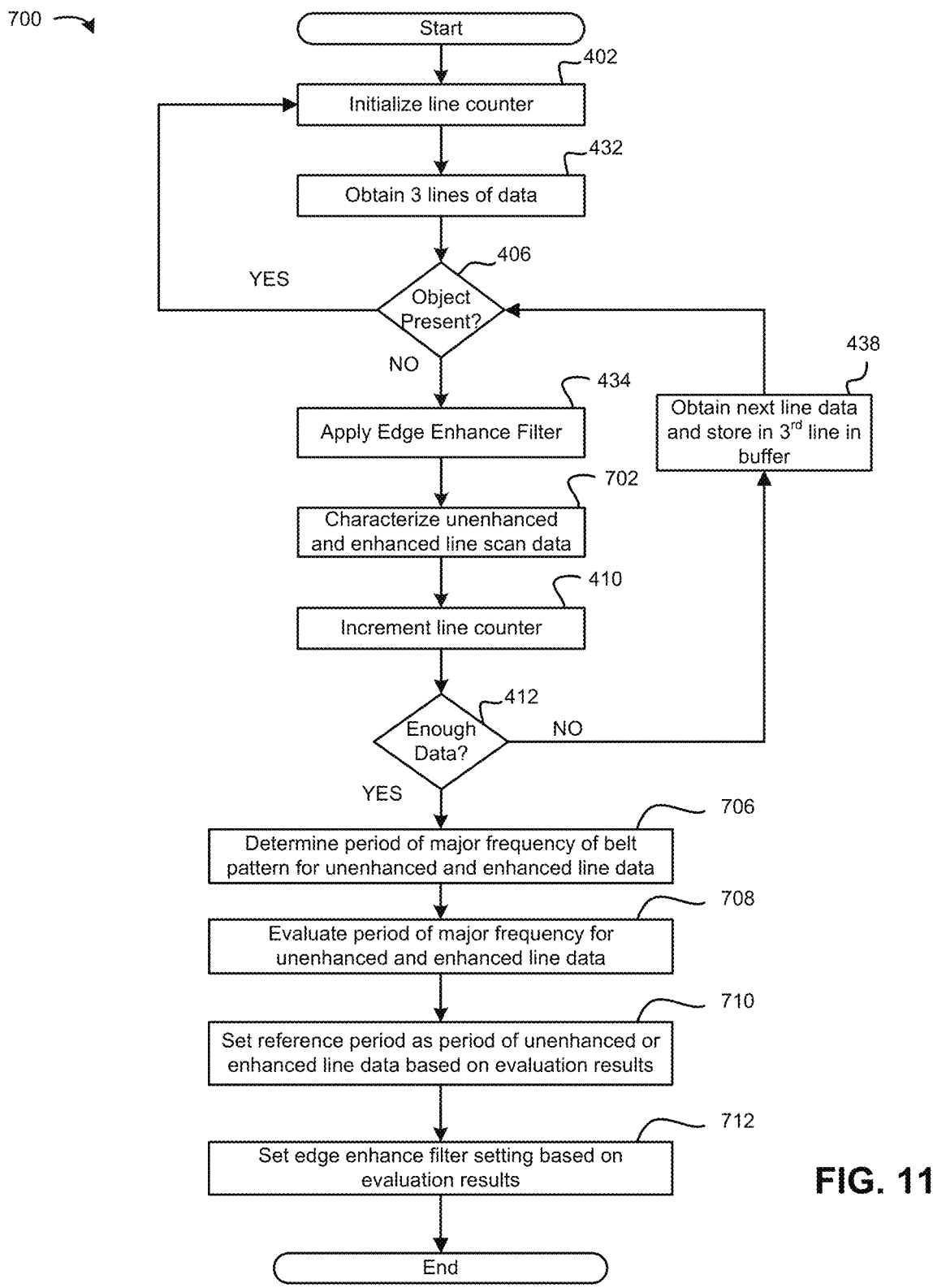
FIG. 11 is a flowchart illustrating an example method of determining a reference period in accordance with one example embodiment of the present disclosure.

Reference is now made to FIG. 11 which illustrates a flowchart of an example training method in which a reference period is determined in accordance with one example embodiment of the present disclosure. The method 700 comprises determining a major frequency similar using operations similar to method 400 of FIG. 8A. The method 700 may be carried out by software executed, for example, by the processor 202 of a line scan camera 200. Alternatively, the method 700 may be implemented by the FPGA 204.

Operations 402 to 434 are performed as described above in connection with FIG. 8B. In operation 702, the processor 202 performs two types of image characterization: (1) image characterization on the ROI of the second line of the unenhanced line data obtain from the line scan sensor 220; and (2) image characterization on the ROI of the second line of the edge enhanced data output from the function enhanceEdges( ). The result of both operations is saved in the buffer memory.

When the minimum number of lines has been obtained (decision block 412), the operations proceed to 706 at which the processor 202 determines (i.e., calculates) a period of a major frequency of the repeated pattern of the travelling surface 150 from the characterized unenhanced line data and enhanced line scan data from operation 702. The period of a major frequency is determined using the method 500 of FIG. 9 described above.

At operation 708, the processor 202 evaluates the period of major frequency for unenhanced and enhanced line data. At operation 710, the processor 202 sets the reference period as the period of the unenhanced or enhanced line data based on the results of the evaluation in operation 708. At operation 712, the processor 202 sets the edge enhance filter setting on or off based on the results of the evaluation in operation 708.

Figure 12:
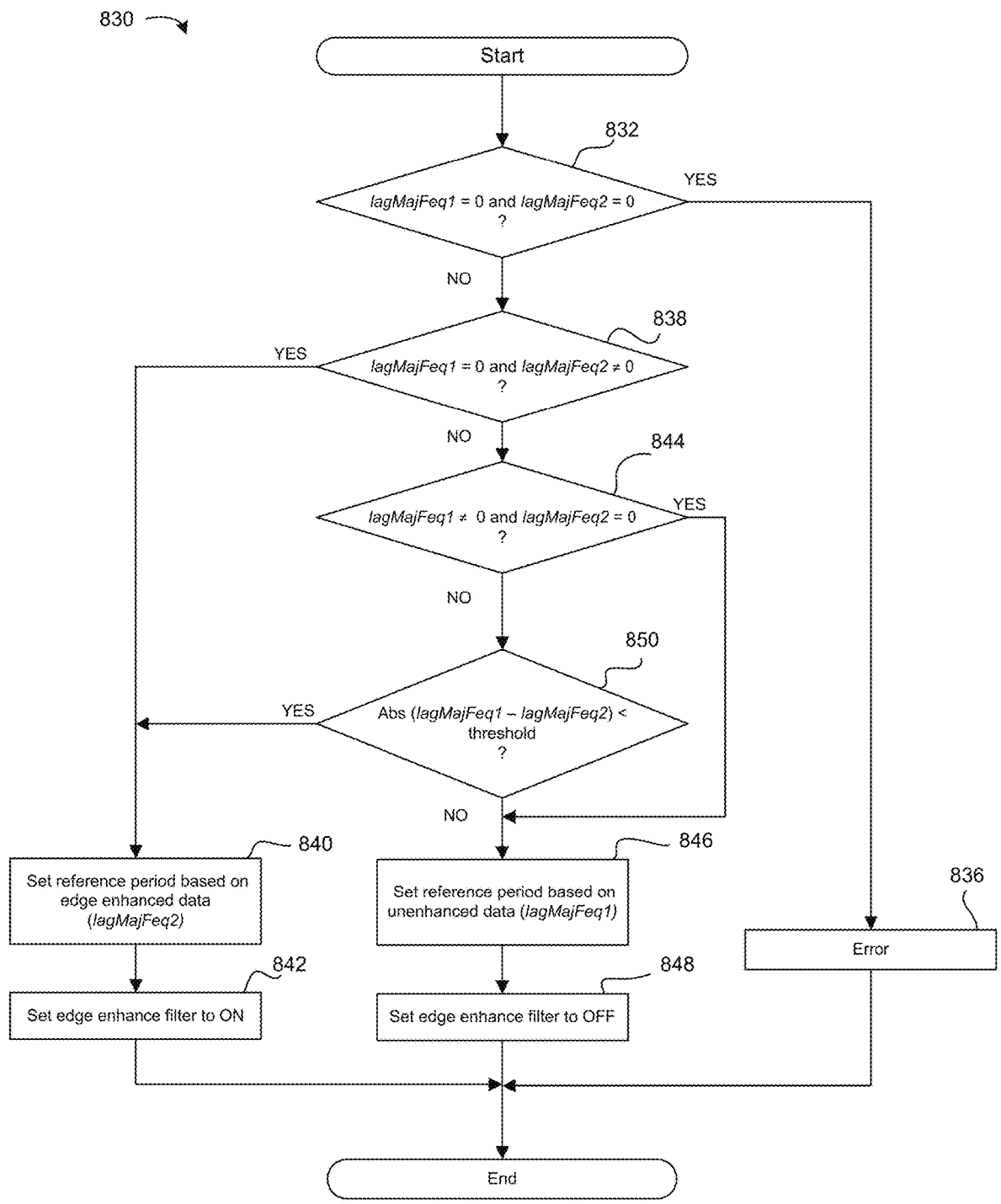
FIG. 12 is a flowchart of a method of evaluating calculated reference periods in accordance with one example embodiment of the present disclosure.

Referring now to FIG. 12 a method 830 of evaluating calculated reference periods in accordance with one example embodiment of the present disclosure will be described. In the method 830, the calculated period of major frequency for unenhanced line data is denoted IagMajFeq1 and the calculated period of the enhanced line data is denoted IagMajFeq2.

At operation 832, the processor 202 determines whether the IagMajFeq1 and IagMajFeq2 are equal to zero. If both IagMajFeq1 and IagMajFeq2 are equal to zero, the processor 202 determines that an error has occurred. For example, the travelling surface 150 is smooth or otherwise does not have a repeated texture. The training operations may be repeated if desired or the travelling surface 150 may be designated incompatible.

At operation 838 the processor 202 determines whether IagMajFeq1 is equal to zero and IagMajFeq2 is not equal to zero. If so, edge enhancement is to be performed based on the results of the training. At operation 840, the processor 202 sets the reference period as the period of the enhanced line data (e.g., IagMajFeq2). Next, at operation 842, the processor 202 sets the edge enhance filter setting to "on".

If the result of the decision block 838 is negative, at operation 844 the processor 202 determines whether IagMajFeq1 is not equal to zero and IagMajFeq2 is equal to zero. If so, edge enhancement is not to be performed based on the results of the training. At operation 846 the processor 202 sets the reference period as the period of the unenhanced line data (e.g., IagMajFeq1). Next, at operation 848, the processor 202 sets the edge enhancement filter setting to "off".

If the result of the decision block 844 is negative, at operation 850 the processor 202 determines whether the absolute value of IagMajFeq1–IagMajFeq2 is less than a threshold. The threshold is determined by the FOV (field of view) and noise level. If so, edge enhancement is to be performed based on the results of the training, and operations proceed to 840. If not, edge enhancement is not to be performed based on the results of the training, and operations proceed to 846.

Figure 13:
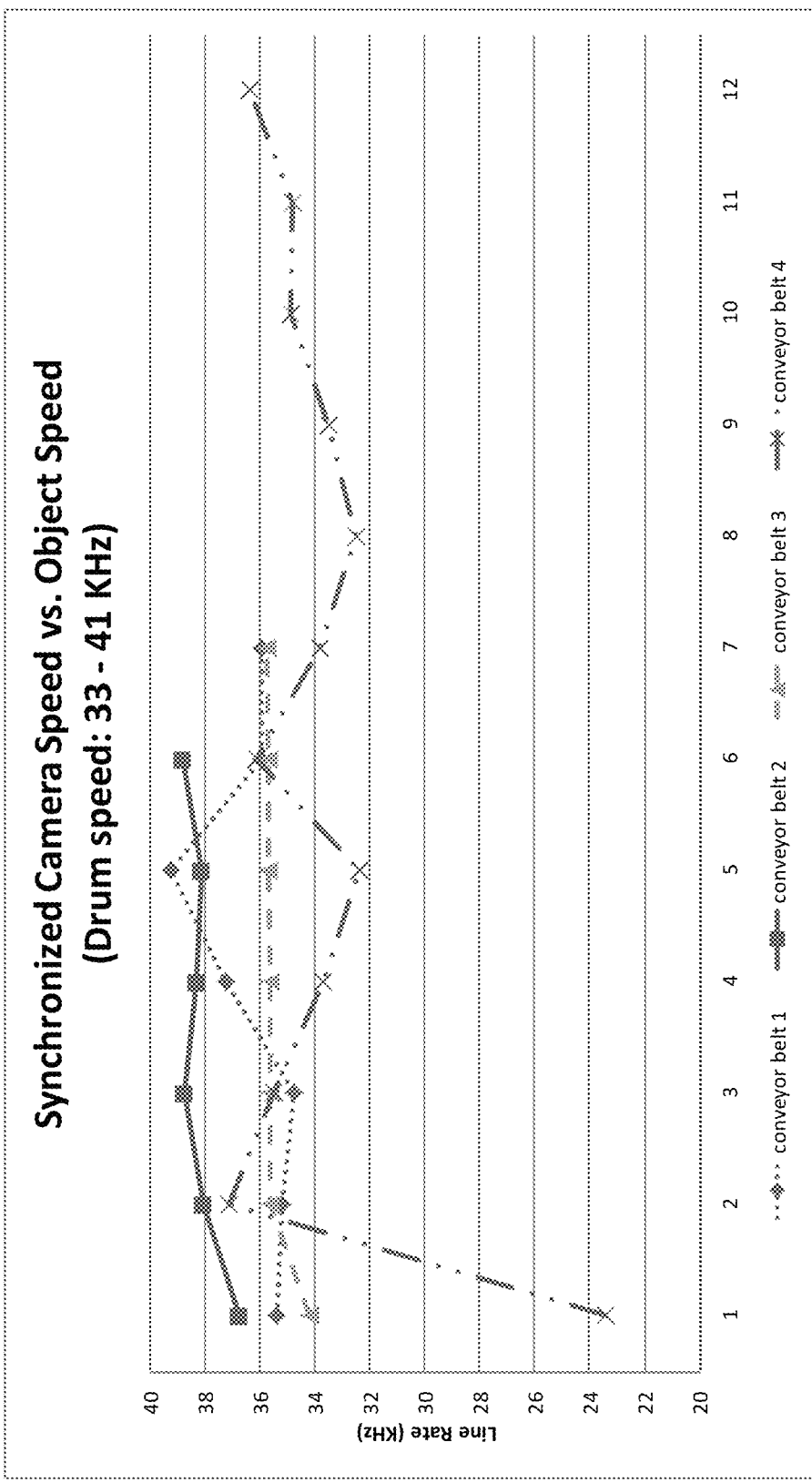
FIG. 13 is a graph illustrating experimental results of synchronizing a line scan camera in accordance with the present disclosure using a rotating drum covered with four different conveyor belt types.

The methods described herein were tested experientially using a Linea™ 8K dual-line color line scan camera running in Green only mode with an internal trigger. Four different belt samples were wrapped on a rotating drum and tested in turn: conveyor belt 1 in FIG. 13 corresponding to the conveyor belt shown in FIG. 3(*c*); conveyor belt 2 in FIG. 13 corresponding to the conveyor belt shown in FIG. 3(*d*); conveyor belt 3 in FIG. 13 corresponding to the conveyor belt shown in FIG. 3(*b*); and conveyor belt 4 in FIG. 13 corresponding to the conveyor belt shown in FIG. 3(*a*). An oscilloscope was used to monitor the drum speed (frequency). An initial line rate of 10 kHz was used and the drum speed varied from 33 kHz to 41 kHz. A software simulator programmed in accordance with the methods described herein was used to measure the period of the major frequency of the belts during rotation and calculate new line rates that were then provided to the line scan camera by command setting. Although the drum exhibited some mechanical flutter in its rotation speed, self-synchronization within acceptable tolerances and reliability was obtained as shown in FIG. 13.

Coding of software for carrying out the described methods is within the scope of a person of ordinary skill in the art provided the present disclosure. The described methods may contain additional or fewer processes than shown and/or described, and may be performed in a different order. Machine readable code executable by the processor 202 to perform the described methods may be stored in a non-transitory machine readable medium such as the memory of the line scan camera 200.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of synchronizing a line scan camera, comprising:
    obtaining line scan data of a region of interest (ROI) of a travelling surface from the line scan camera, the line scan camera being oriented perpendicular to a direction of travel of the travelling surface, the line scan data comprising a plurality of lines;
    identifying occurrences of a major frequency of a repeated texture on the travelling surface in the direction of travel of the travelling surface using characterized line scan data for each line in the plurality of lines of the line scan data, wherein the characterized line scan data for each line is a statistical measure of the pixel values of each line of the line scan data, each of the pixel values being a digital number;
    determining a period of the major frequency; and
    changing a line rate of the line scan camera in response to a determination that the determined period is different than a reference period.

2. The method of claim 1, wherein the major frequency of the repeated texture is determined using autocorrelation.

3. The method of claim 1, wherein the major frequency of the repeated texture comprises:
    performing a Fast Fourier Transform (FFT) on the characterized line scan data to obtain an FFT spectrum;
    multiplying the FFT spectrum by a complex conjugate of the FFT spectrum to obtain a product;
    performing an inverse FFT (IFFT) on the product to obtain an IFFT sequence; and
    determining local peaks in the IFFT sequence.

4. The method of claim 3, wherein determining the period of the major frequency comprises:
    determining the difference between the local peaks as occurrences of the major frequency of the repeated texture on the travelling surface; and
    determining the mean of the differences as the period of the major frequency.

5. The method of claim 1, wherein the ROI is a portion of a field of view (FOV) of the line scan camera.

6. The method of claim 5, wherein the ROI is located towards an edge of the FOV of the line scan camera.

7. The method of claim 1, further comprising:
    maintaining the line rate of the line scan camera in response to a determination that the determined period is the same as the reference period.

8. The method of claim 1, wherein changing the line rate of the line scan camera in response to a determination that the determined period is different than a reference period comprises:

increasing the line rate of the line scan camera in response to a determination that the determined period is lower than the reference period; and decreasing the line rate of the line scan camera in response to a determination that the determined frequency is higher than the reference period.

9. The method of claim 1, further comprising:
characterizing the line scan data obtained from the line scan camera.

10. The method of claim 9, wherein characterizing the line scan data comprises applying a noise reduction filter.

11. The method of claim 9, wherein characterizing the line scan data comprises determining a mean value of the digital number of the pixel values of each line of line scan data.

12. The method of claim 1, further comprising:
before characterizing the line scan data, performing edge enhancement on the line scan data obtained from the line scan camera.

13. The method of claim 1, wherein the reference period is the period of the major frequency in horizontal direction if the textures are equal in horizontal and vertical directions, or the period of the major frequency in vertical direction if the textures are not equal in horizontal and vertical directions.

14. The method of claim 1, wherein the reference period is determined in real-time or in training prior to real-time operations.

15. The method of claim 1, wherein the major frequency is a vertical frequency of the repeated texture on the travelling surface in the direction of travel of the travelling surface.

16. The method of claim 1, further comprising:
identifying occurrences of a major horizontal frequency of the repeated texture on the travelling surface in the direction of perpendicular to the travel of the travelling surface using characterized line scan data for each line in the plurality of lines of the line scan data;
determining a period of the major horizontal frequency; and
setting the period of the major horizontal frequency as the reference period.

17. A line scan camera, comprising:
a line scan sensor comprising one or more lines of pixels;
a controller coupled to the line scan sensor and configured to cause the line scan camera to:
obtain line scan data of a region of interest (ROI) of a travelling surface from the line scan camera, the line scan camera being oriented perpendicular to a direction of travel of the travelling surface, the line scan data comprising a plurality of lines;
identify occurrences of a major frequency of a repeated texture on the travelling surface in the direction of travel of the travelling surface using characterized line scan data for each line in the plurality of lines of the line scan data, wherein the characterized line scan data for each line is a statistical measure of the pixel values of each line of the line scan data, each of the pixel values being a digital number;
determine a period of the major frequency; and
change a line rate of the line scan camera in response to a determination that the determined period is different than a reference period.

18. The line scan camera of claim 17, wherein the line scan camera is a single line, line scan camera.

19. The line scan camera of claim 17, wherein the controller is a field-programmable gate array.

20. A non-transitory machine readable medium having tangibly stored thereon executable instructions for execution by a processor of a line scan camera, wherein the executable instructions, in response to execution by the processor, cause the line scan camera to:
obtain line scan data of a region of interest (ROI) of a travelling surface from the line scan camera, the line scan camera being oriented perpendicular to a direction of travel of the travelling surface, the line scan data comprising a plurality of lines;
identify occurrences of a major frequency of a repeated texture on the travelling surface in the direction of travel of the travelling surface using characterized line scan data for each line in the plurality of lines of the line scan data, wherein the characterized line scan data for each line is a statistical measure of the pixel values of each line of the line scan data, each of the pixel values being a digital number;
determine a period of the major frequency; and
change a line rate of the line scan camera in response to a determination that the determined period is different than a reference period.

* * * * *